Sept. 12, 1967  P. C. PATERSON  3,341,265
UNITIZED DUAL LIP SEAL
Filed Sept. 3, 1965
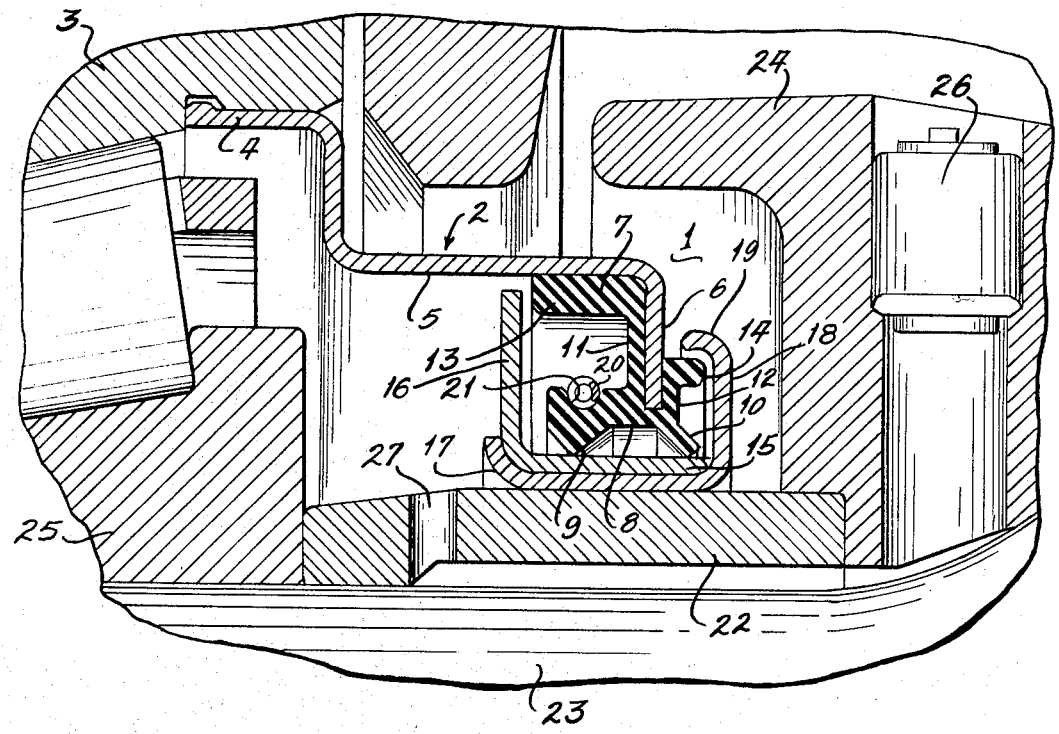
INVENTOR:
PETER C. PATERSON
BY *Gravely, Lieder & Woodruff*
ATTORNEYS.

United States Patent Office

3,341,265
Patented Sept. 12, 1967

3,341,265
UNITIZED DUAL LIP SEAL
Peter C. Paterson, Canton, Ohio, assignor to The Timken Roller Bearing Company, Canton, Ohio, a corporation of Ohio
Filed Sept. 3, 1965, Ser. No. 484,864
10 Claims. (Cl. 308—187.1)

This invention relates to a unitized dual lip seal for rotary shafts, and more particularly to a unitized dual lip seal for rotary shafts wherein the sealing member is bonded onto the free end and adjacent surfaces of an inwardly directed radial flange of a seal case and includes integral molded bumpers which prevent damage to the seal member by the rotating portions of the shaft seal.

Various shaft seals, which include a fluid sealing lip and a dust sealing lip, have been proposed to provide unitized dual lip seals. However, most of such seals require an excessive number of parts and components to achieve the desired results. Many require several metal parts to support and retain the seal lips. Moreover, the complexity of the seal affects the durability of the seal and heat dissipation from the seal.

The present invention provides a simple and inexpensive construction for unitized dual lip seal. Briefly, the invention provides an integral, resilient elastomer bonded directly to the free end and adjacent surfaces of a radial flange of the seal case, and provides a fluid sealing lip and a dust sealing lip on opposite sides of the radial flange, as well as guard bumpers to prevent damage to the sealing lips by the rotating portions of the seal. Moreover, the seal appertaining to the invention contemplates a seal wear ring and a thrust ring which encase the integral seal member and rotate relative thereto.

It is therefore an object of the invention to provide a unitized dual lip seal including a seal member integrally bonded to an inwardly directed radial flange of a seal case, and having relatively rotatable members which provide a seal wear surface and encase the integral seal member.

It is another object of the invention to provide a unitized dual lip seal having an integrally molded seal member with dual sealing lips and protective bumpers which is simple and easy to manufacture.

It is another object of the invention to provide a unitized dual lip seal for a railway car axle journal, including a seal case having an inwardly directed radial flange, an integral, resilient seal member bonded onto the free end and adjacent surfaces of the radial flange of the seal case, and a relatively rotatable member encasing said integral resilient member and providing a sealing surface for said seal member, said rotating member engaging the rotary part of the journal to provide a seal thereto.

It is another object of the invention to provide the unitized dual lip seal for a railway car axle journal including a seal case, a seal member bonded to a radial flange of said seal case having an integral fluid sealing lip and protective bumper on one side of said radial flange and an integral dust sealing lip and protective bumper on the other side of said radial flange, a seal wear ring having a cylindrical portion for seating said fluid sealing lip and said dust sealing lip and a radial portion extending adjacent said bumper member, and a thrust ring for unitizing the seal and seated to the shaft for rotation therewith.

These and other objects and advantages of the invention will become apparent from the ensuing description taken in conjunction with the sole figure which illustrates a partial cross section of the unitized dual lip seal in a railway car axle journal.

Referring to the figure, the unitized dual lip seal 1 includes a generally cylindrical seal case 2 seated along a cylindrical flange 4 extending from one end of cylindrical body 5 of the seal case against the internal surface of a bearing cup 3 in the bearing assembly of a railway car axle journal. The other end of the seal case has an inwardly directed radial flange 6 extending from the cylindrical body 5 of the seal case 2. A resilient seal member 7 has a central body 8 adjoining a fluid sealing lip 9 and a dust sealing lip 10. The fluid lip 9 and dust lip 10 are molded as diagonally diverging flanges of the central body 8. Also, the central body 8 has an integral inner radial flange 11 and an integral outer radial flange 12 which bond the seal member 7 along the free end and adjacent sides of radial flange 6. The inner radial flange 11 has an integral bumper member 13 extending beyond fluid sealing lip 9 along and bonded to a portion of the inner surface of the cylindrical body 5. The outer flange 12 of central body 8 has a cylindrical bumper rim 14 which projects beyond dust lip 10 to provide a protective bumper therefor. The fluid lip 9 and dust lip 10 ride on the cylindrical surface of a wear ring 15 having a radial flange 16 which extends spaced axially adjacent the bumper member 13 of the seal member 7. The wear ring 15 is nested in a thrust ring 17 which has a radial flange or member 18 extending axially adjacent the end of cylindrical rim bumper 14, and has a rolled lip 19 extending around bumper member 14 towards radial flange 6 of the seal case 2. A garter spring 20 is positioned in a depression 21 on the back side of the sealing edge of fluid lip 9 to maintain good sealing pressure between the fluid sealing lip 9 and the seal wear ring 15.

In the particular railway car axle journal utilizing the unitized dual lip seal as illustrated in the sole figure, the thrust ring 17 is press fitted to a spacer ring 22 which is press fitted to axle 23 of the railway car journal and is positioned between backing ring 24 and cone 25 of the bearing assembly. Backing ring 24 includes a vent fitting 26. A vent passage is provided from vent fitting 26 into the seal case 2 along axle 23 and through port 27 in the spacer ring 22. Although the thrust ring 17 is illustrated as press fitted onto spacer ring 22, it will be appreciated that in other type applications the thrust ring would be seated directly to the axle or shaft to be sealed. Moreover, if heat dissipation through the thrust ring and spacer ring to the axle or just through the thrust ring to the axle is not a factor, a rubber coating on the surface of the thrust ring could be provided to seal the thrust ring to the spacer ring or axle.

In the application illustrated, the unitized dual lip seal is installed in the axle journal of a railway car by first press fitting the unitized dual lip seal over the spacer ring 22. This press fit causes the radial flange 16 of the wear ring 15 to engage bumper member 13. The unitized dual lip seal is pressed into the bearing cup 3 of the bearing assembly of the axle journal. Rubbing contact between radial flange 16 and bumper member 13 will occur until lateral movement of the thrust ring 17 repositions the wear ring free of the bumper extension, or rubbing contact will occur until the bumper member is worn sufficiently to clear the wear ring radial flange 16. In other applications, it will be appreciated that the thrust ring will engage cylindrical rim bumper 14, and will be either repositioned by lateral movement of the thrust ring or will wear the bumper down sufficiently to provide clearance.

It will be appreciated that the invention provides a unitized dual seal in which all internal parts are permanently assembled and the complete seal can be treated as a unit. Also, the seal assembly is self-locating during operation, hence the seal thrust ring will locate at the proper area of the spacer ring by lateral motion thereof or without lateral motion by wear of the bumpers. Moreover, the flanges of the seal wear ring and the thrust ring act as fingers. Thus, the seal wear ring flange has the additional feature of preventing fluid flow directly on the fluid sealing lip, and the flinger on the thrust ring helps prevent dirt from reaching the dust sealing lip.

It will be appreciated that various changes and modifications will be immediately apparent to those skilled in the art, and that the invention contemplates such modifications and changes. All such changes and modifications are deemed to be within the scope of the invention which is limited only by the scope of the appended claims.

What is claimed is:

1. A unitized dual lip seal for a rotary shaft comprising a cylindrical seal casing having an inwardly directed radial flange, a seal member having a main body portion adjoining a pair of diagonally diverging sealing lips and having an inner flange portion and an outer flange portion, said seal member bonded to said radial flange along said inner flange portion and said outer flange portion, said outer flange portion having a cylindrical bumper rim extending beyond one of said sealing lips, and said inner flange portion having an inner bumper member bonded to said seal case and extending longitudinally beyond the other of said sealing lips, a wear member having a cylindrical portion for said sealing lips to seat on and having an outwardly directed radial portion extending axially adjacent said inner bumper member and spaced from said seal case, and a thrust ring having a cylindrical part nested with the cylindrical portion of said wear member and having a radial member outwardly extending beyond said bumper rim and terminating in a roller lip extending around said bumper rim.

2. The dual lip seal of claim 1 wherein a garter spring is seated on the backside of the other of said sealing lips.

3. A unitized dual lip seal for a rotary shaft comprising a cylindrical seal casing having an inwardly directed radial flange, a seal member bonded over the free end and adjacent surfaces of said radial flange, said seal member having a pair of diagonally diverging sealing lips projecting on opposite sides of said radial flange and having a pair of bumper members extending in opposite directions from said radial flange and beyond the ends of corresponding sealing lips, a wear member having a cylindrical portion for said sealing lips to seat on and having an outwardly directed radial portion extending axially adjacent one of said bumper extensions and spaced from said seal case, a thrust member having a cylindrical part nested with said cylindrical portion of said wear member for receiving a shaft and having an outwardly directed radial member extending axially adjacent the other of said bumper members and terminating in a rolled lip extending around the other of said bumper members, said bumper members permitting limited longitudinal movement of said wear member and said thrust member relative to said seal case.

4. The dual lip seal of claim 3 wherein a garter spring is seated on the backside of one of said sealing lips.

5. In a railway car axle journal assembly including a bearing assembly having a bearing cup and a bearing cone, a backing ring and a spacer ring seated on the axle between the backing ring and bearing cone, a unitized dual lip seal for the axle and bearing assembly comprising a cylindrical seal casing secured by one end thereof to the bearing cup and having an inwardly directed radial flange at the other end thereof, a seal member having a main body portion adjoining a pair of diagonally diverging sealing lips and having an inner flange portion and an outer flange portion, said seal member bonded to said radial flange along said inner flange portion and said outer flange portion, said outer flange portion having a cylindrical bumper rim extending beyond one of said sealing lips, and said inner flange portion having an inner bumper member bonded to said seal case and extending longitudinally beyond the other of said sealing lips, a wear member having a cylindrical portion for said sealing lips to seat on and having an outwardly directed radial portion extending axially adjacent said inner bumper member and spaced from said seal case, and a thrust ring having a cylindrical part nested with the cylindrical portion of said wear member and seated on the spacer ring and having a radial member outwardly extending beyond said bumper rim and axially spaced therefrom terminating in a rolled lip extending around said bumper rim.

6. In a railway car axle journal assembly including a bearing assembly having a bearing cup and a bearing cone, a backing ring and a spacer ring seated on the axle between the backing ring and bearing cone, a unitized dual lip seal for the axle and bearing assembly comprising a cylindrical seal casing secured by one end thereof to the bearing cup and having an inwardly directed radial flange at the other end thereof, a seal member bonded over the free end and adjacent surfaces of said radial flange, said seal member having a pair of diagonally diverging sealing lips projecting on opposite sides of said radial flange and having a pair of bumper members extending in opposite directions from said radial flange and beyond the ends of corresponding sealing lips, a wear member having a cylindrical portion for said sealing lips to seat on and having an outwardly directed radial portion extending axially adjacent one of said bumper extensions and spaced from said seal case, a thrust member having a cylindrical part nested with said cylindrical portion of said wear member and seated on the spacer ring and having an outwardly directed radial member extending axially adjacent the other of said bumper members and terminating in a rolled lip extending around the other of said bumper members, said bumper members permitting limited longitudinal movement of said wear member and said thrust member relative to said spacer ring.

7. In a railway car axle journal assembly including a bearing assembly, a unitized dual lip seal for the axle and bearing assembly comprising a cylindrical seal casing secured by one end thereof to the bearing assembly and having an inwardly directed radial flange at the other end thereof, a seal member having a main body portion adjoining a pair of diagonally diverging sealing lips and having an inner flange portion and an outer flange portion, said seal member bonded to said radial flange along said inner flange portion and said outer flange portion, said outer flange portion having a cylindrical bumper rim extending beyond one of said sealing lips, and said inner flange portion having an inner bumper member bonded to said seal case and extending longitudinally beyond the other of said sealing lips, a wear member having a cylindrical portion for said sealing lips to seat on and having an outwardly directed radial portion extending axially adjacent said inner bumper member and spaced from said seal case, and a thrust ring having a cylindrical part nested with the cylindrical portion of said wear member and seated on the axle and having a radial member outwardly extending beyond said bumper rim and axially spaced therefrom terminating in a rolled lip extending around said bumper rim.

8. The dual lip seal of claim 7 wherein a garter spring is seated on the backside of the other of said sealing lips.

9. In a railway car axle journal assembly including a bearing assembly, a unitized dual lip seal for the axle and bearing assembly comprising a cylindrical seal casing secured by one end thereof to the bearing assembly and having an inwardly directed radial flange at the other end thereof, a seal member bonded over the free end and adjacent surfaces of said radial flange, said seal member having a pair of diagonally diverging sealing lips projecting on opposite sides of said radial flange and having a pair of bumper members extending in opposite directions from said radial flange and beyond the ends of corresponding sealing lips, a wear member having a cylindrical portion for said sealing lips to seat on and having an outwardly directed radial portion extending axially adjacent one of said bumper extensions and spaced from said seal case, a thrust member having a cylindrical part nested with said cylindrical portion of said wear member and seated on the axle and having an outwardly directed radial member extending axially adjacent the other of said bumper members and terminating in a rolled lip extending around the other of said bumper members, said bumper members permitting limited longitudinal movement of said wear member and said thrust member relative to said spacer ring.

10. The dual lip seal of claim 9 wherein a garter spring is seated on the backside of one of said sealing lips.

References Cited

UNITED STATES PATENTS 3,021,161   2/1962   Rhoads et al. _ _ _ _ _ _ 277—153 X

FOREIGN PATENTS 703,022   2/1965   Canada.

MARTIN P. SCHWADRON, *Primary Examiner.*

R. A. DUA, *Assistant Examiner.*